United States Patent
Yim et al.

(10) Patent No.: US 9,260,124 B1
(45) Date of Patent: Feb. 16, 2016

(54) FOLDING GOLF CART

(71) Applicant: HYUNGSUNG CORPORATION, Gyeonggi-di (KR)

(72) Inventors: Hyung Jin Yim, Seoul (KR); Kyung Hee Moon, Seoul (KR); Tae Hwa Moon, Incheon (KR)

(73) Assignee: Hyungsung Corporation, Gyeonggi-do (SK)

( * ) Notice: Subject to any disclaimer, the term of this patent is extended or adjusted under 35 U.S.C. 154(b) by 0 days.

(21) Appl. No.: 14/610,374

(22) Filed: Jan. 30, 2015

(30) Foreign Application Priority Data

Nov. 12, 2014  (KR) .......................... 10-2014-0156795

(51) Int. Cl.
*B62B 3/02* (2006.01)
*A63B 55/08* (2006.01)

(52) U.S. Cl.
CPC .. *B62B 3/02* (2013.01); *A63B 55/08* (2013.01)

(58) Field of Classification Search
CPC ...................... B62B 2202/404; B62B 2205/12; B62B 3/12; B62B 3/02; A63B 55/08; Y10S 280/06
See application file for complete search history.

(56) References Cited

U.S. PATENT DOCUMENTS

| | | | | |
|---|---|---|---|---|
| 2,518,803 A | * | 8/1950 | Marvin | B62B 1/042 280/13 |
| 3,937,485 A | * | 2/1976 | Shourek | B62B 3/04 280/35 |
| D292,039 S | * | 9/1987 | Moore | B62B 3/04 D34/15 |
| 4,744,585 A | * | 5/1988 | Huang | B62B 1/042 280/646 |
| 4,793,622 A | * | 12/1988 | Sydlow | B62B 1/042 280/40 |
| 5,351,983 A | * | 10/1994 | Descalo | B62B 1/12 248/96 |
| 5,421,434 A | * | 6/1995 | Liao | A61G 5/1027 188/1.12 |
| 5,582,419 A | * | 12/1996 | Lucia | B62B 1/045 280/42 |

(Continued)

*Primary Examiner* — Brodie Follman
(74) *Attorney, Agent, or Firm* — Edell, Shapiro & Finnan LLC

(57) ABSTRACT

Disclosed is a folding golf cart including a front frame having a bag bottom carrier, two rear wheel frames connected to the front frame via connecting bars, vertical pivot frames installed to the rear wheel frames so as to be pivotable upward and toward a front wheel, a bag support frame connected to the vertical pivot frames via pillars, the bag support frame having a bag support member and a pull handle, a longitudinal prop installed between the front frame and the bag support frame, and a transverse prop installed between the rear wheel frames. The golf cart ensures easy folding thereof, takes the form of a small volume box in a folded state thereof, and is convenient in handling owing to a relatively light weight.

3 Claims, 5 Drawing Sheets

(56) References Cited

U.S. PATENT DOCUMENTS

| | | | | |
|---|---|---|---|---|
| 5,586,778 A | * | 12/1996 | Lindh | A63B 55/08 280/40 |
| 5,997,105 A | * | 12/1999 | Wu | A63B 55/08 280/DIG. 6 |
| 6,000,712 A | * | 12/1999 | Wu | B62B 3/022 280/47.34 |
| 6,056,369 A | * | 5/2000 | Lin | B60B 7/10 280/DIG. 6 |
| 6,152,465 A | * | 11/2000 | Shieh | B62B 1/042 280/62 |
| 6,186,520 B1 | * | 2/2001 | Barten | B62B 1/042 280/30 |
| 6,299,195 B1 | * | 10/2001 | Chan | B62B 3/02 280/47.34 |
| 6,331,091 B2 | * | 12/2001 | Cross | B62B 3/04 403/316 |
| 6,460,867 B2 | * | 10/2002 | Sciulli | A63B 55/04 280/47.26 |
| 6,481,518 B1 | * | 11/2002 | Wu | A63B 55/08 180/19.1 |
| 6,695,324 B1 | * | 2/2004 | Wu | B62B 1/045 280/40 |
| 6,698,789 B2 | * | 3/2004 | Reimers | B62B 1/045 280/40 |
| 6,997,274 B2 | * | 2/2006 | Metten | A63B 55/00 180/19.1 |
| 7,000,928 B2 | * | 2/2006 | Liao | B62B 1/002 280/38 |
| 7,114,730 B2 | * | 10/2006 | Cheldin | A63B 55/08 280/47.24 |
| 7,147,242 B2 | * | 12/2006 | Wu | B62B 3/12 280/641 |
| 7,219,920 B2 | * | 5/2007 | Lin | B62B 1/045 280/47.24 |
| 7,419,168 B2 | * | 9/2008 | Felty | A63C 17/01 280/11.223 |
| 7,862,053 B2 | * | 1/2011 | Liao | B62B 3/02 280/38 |
| 8,292,321 B2 | * | 10/2012 | Liao | B62B 3/02 280/47.26 |
| 8,366,140 B2 | * | 2/2013 | Wu | B62B 3/02 280/651 |
| 8,393,633 B2 | * | 3/2013 | Liao | B62B 3/02 280/40 |
| 8,403,355 B2 | * | 3/2013 | Liao | B62B 3/02 280/40 |
| 8,439,390 B2 | * | 5/2013 | Zhang | B62B 3/02 280/47.34 |
| 8,500,140 B1 | * | 8/2013 | Liao | B62B 7/10 280/38 |
| 8,544,871 B1 | * | 10/2013 | Liao | B62B 3/02 280/62 |
| 8,613,463 B2 | * | 12/2013 | Liao | B62B 3/02 280/651 |
| 8,820,775 B2 | * | 9/2014 | Wang | B62B 5/0433 280/42 |
| 2001/0009632 A1 | * | 7/2001 | Cross | A63C 17/22 403/322.2 |
| 2002/0070512 A1 | * | 6/2002 | Szendel | A63C 17/22 280/11.27 |
| 2005/0269803 A1 | * | 12/2005 | Wu | B62B 3/02 280/651 |
| 2012/0306182 A1 | * | 12/2012 | Liao | B62B 3/02 280/651 |

\* cited by examiner

FOLDING GOLF CART

CROSS REFERENCE TO RELATED APPLICATIONS

This application claims foreign priority under 35 U.S.C. §119(a)-(d) to Application No. KR 10-2014-0156795 filed on Nov. 12, 2014, entitled "Folding Golf Cart," the entire contents of which are hereby incorporated by reference.

FIELD OF THE INVENTION

The present invention relates to personal folding golf carts and, more particularly, to golf carts which enable installation of three wheels to realize an electric-powered golf cart.

BACKGROUND

Many golfers use manual pull golf carts that golfers pull around, or use carts that golfers ride on. Most golfers use manual pull golf carts. This is because electric-powered pull golf carts are not only relatively expensive, but also are heavy and have difficulty in folding, thereby having a great volume in a folded state. In particular, these electric-powered pull golf carts cause the old and the infirm to have trouble in loading or unloading the golf carts to or from cars and also make it difficult for several golfers to travel in a single car. In addition, conventional carts need to reduce a length of a wheelbase in terms of portability, which may cause a risk of overturn at complex topographical areas such as mountainous areas.

SUMMARY

Therefore, the present invention has been made in view of the problems of the related art, and it is an object of the present invention to provide golf carts, which are capable of allowing installation of electric devices and ensuring easy folding as well as a reduced volume in a folded state, which are convenient in handling owing to a relatively light weight, and which are capable of reducing a risk of overturn through use of a long wheelbase.

In accordance with an aspect of the present invention, the above and other objects can be accomplished by the provision of a folding golf cart including a front frame having a bag bottom carrier, two rear wheel frames connected to the front frame via connecting bars, the connecting bars having both ends connected respectively to the frames via shafts, two rear wheels installed respectively to the two rear wheel frames, vertical pivot frames installed respectively to the rear wheel frames so as to be pivoted in a vertical direction, a bag support frame connected to the vertical pivot frames via pillars, the pillars being connected respectively to the vertical pivot frames via shafts, the bag support frame having a bag support member and a pull handle, a longitudinal prop installed between the front frame and the bag support frame, and a transverse prop installed between the rear wheel frames.

According to the present invention, a body of a golf cart comprised of two connecting bars, two pillars, and two props is foldable into a small volume box form, which may achieve remarkable reduction in the volume of the cart in a folded state thereof. Further, the golf cart according to the present invention may have a reduced weight owing to a smaller number of constituent components of the body as compared to conventional golf carts, which allow the old and the infirm as well as women to easily load or unload the golf cart to or from the car trunk. Moreover, such a reduced volume of the golf cart allows four golfers to travel in a single car. In addition, according to the present invention, through use of a relatively long wheelbase between left and right rear wheels and between the rear wheels and a front wheel, it is possible to considerably reduce a risk of overturn at hummocky golf courses.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
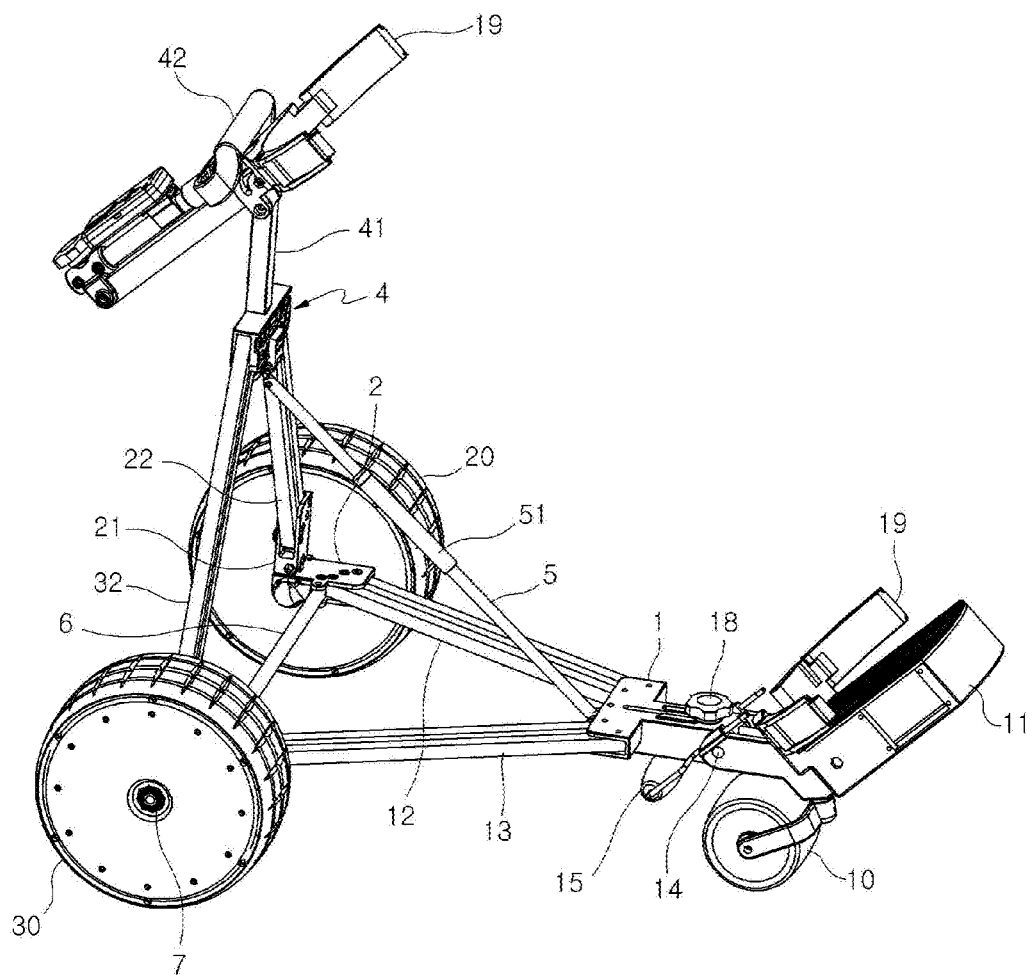
FIG. 1 is a perspective view illustrating one embodiment of the present invention.
Figure 2:
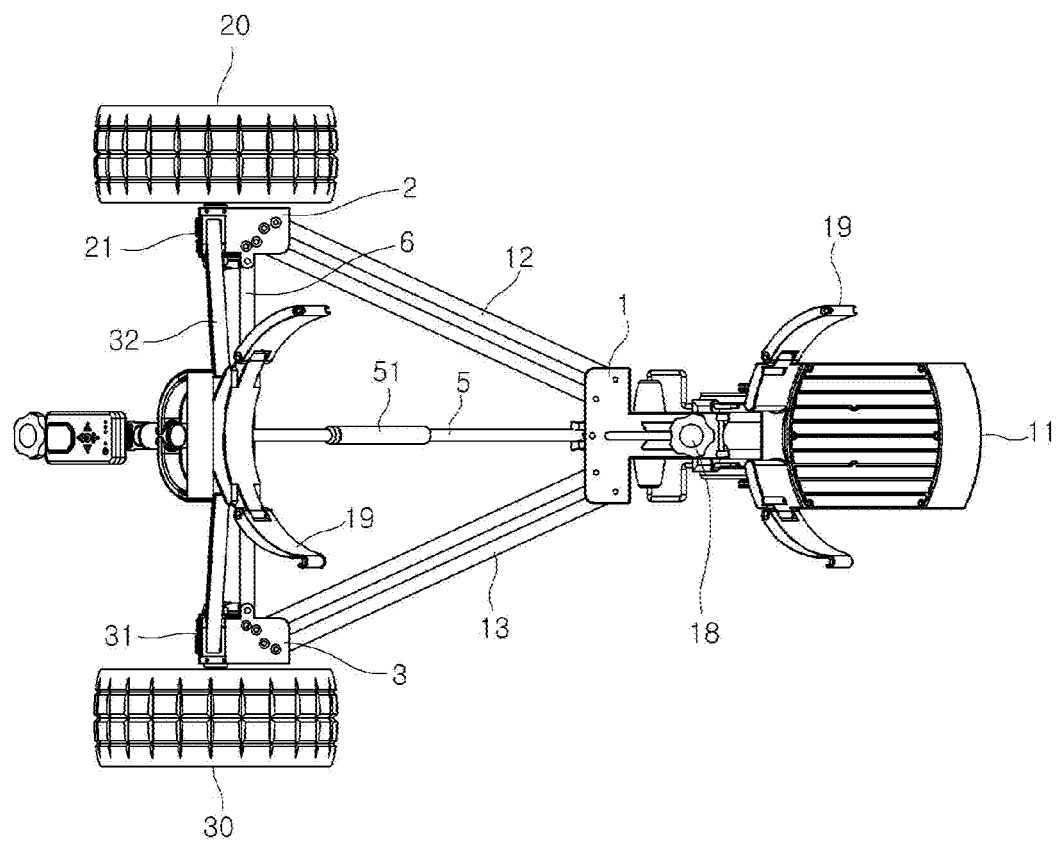
FIG. 2 is a plan view illustrating the embodiment shown in FIG. 1.

The present invention provides a folding golf cart including a front frame 1 having a bag bottom carrier 11, two rear wheel frames 2 and 3 connected to the front frame 1 via connecting bars 12 and 13, both ends of which are connected respectively to the frames via shafts, two rear wheels 20 and 30 installed respectively to the two rear wheel frames 2 and 3, vertical pivot frames 21 and 31 installed respectively to the rear wheel frames 2 and 3 so as to be pivoted upward and toward a front wheel, pillars 22 and 32 connected respectively to the vertical pivot frames 21 and 31 via shafts, and a bag support frame 4 connected to the pillars 22 and 32 via shafts, the bag support frame 4 having a bag support member 41 and a pull handle 42.

The present invention provides a folding golf cart which includes, as will be easily understood from FIG. 1, a front frame 1 having a bag bottom carrier 11, two rear wheel frames 2 and 3 connected to the front frame 1 via connecting bars 12 and 13, both ends of which are connected respectively to the frames via shafts, two rear wheels 20 and 30 installed respectively to the two rear wheel frames 2 and 3, vertical pivot frames 21 and 31 installed respectively to the rear wheel frames 2 and 3 so as to be pivotable upward and toward a front wheel, pillars 22 and 32 connected respectively to the vertical pivot frames 21 and 31 via shafts, a bag support frame 4 connected to the pillars 22 and 32 via shafts, the bag support frame 4 having a bag support member 41 and a pull handle 42, a longitudinal prop 5 installed between the front frame 1 and the bag support frame 4, and a transverse prop 6 installed between the two rear wheel frames 2 and 3.

Preferably, each of the connecting bars 12 and 13 that connect the front frame 1 to the respective rear wheel frames 2 and 3 and each of the pillars 22 and 32 that connect the vertical pivot frames 21 and 31 of the rear wheel frames 2 and 3 to the bag support frame 4 is provided in a number of two or more to ensure the front frame 1, the rear wheel frames 2 and 3, and the bag support frame 4 to be kept in parallel with one another, which may enhance stability of the entire cart body. The stability of the cart body is very important in consideration of curvy golf courses and loading of heavy golf bags.

The bag bottom carrier 11, which is installed to the front frame 1, is preferably connected to the front frame 1 via a shaft 14, and the bag bottom carrier 11 is preferably provided with a front wheel 10. The bag bottom carrier 11 preferably has a rectangular battery box.

To prevent the bag bottom carrier 11, which is installed to the front frame 1 via the shaft 14, from arbitrarily pivoting about the shaft 14, a shaft coupling device between the front wheel frame 1 and a front wheel bundle requires a pivoting control device to control pivoting about the shaft 14.

Figure 3:
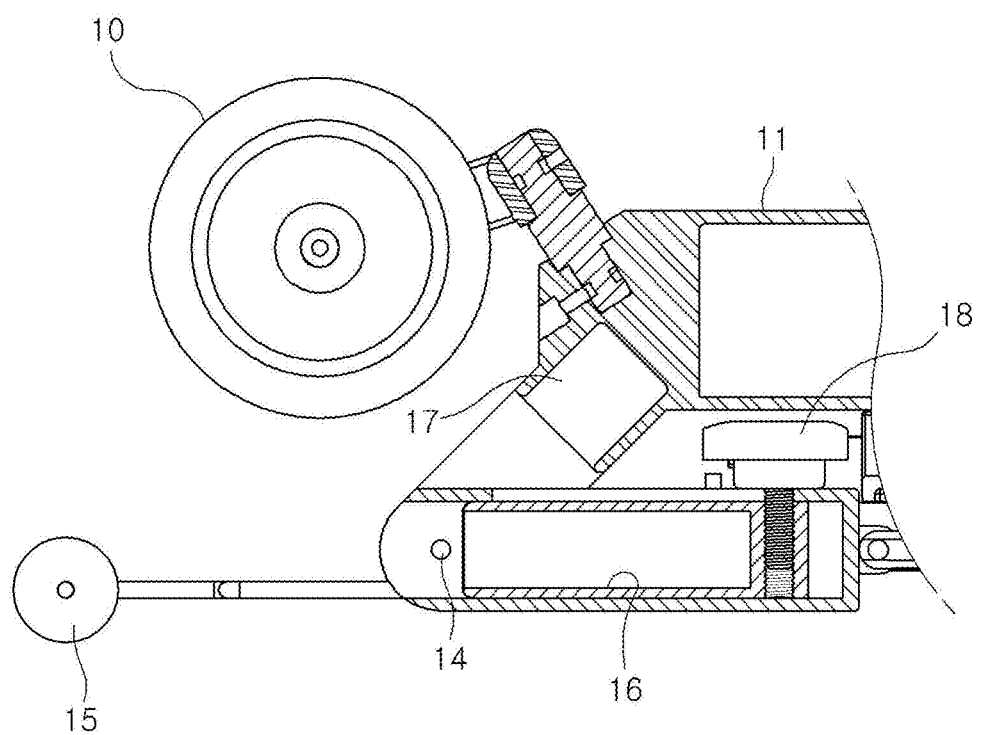
FIGS. 3 and 4 are views illustrating an embodiment in which a pivoting control device, which prevents a bag bottom carrier 11 installed to a front frame via a shaft from arbitrarily pivoting about the shaft, takes the form of a coupling rod device, FIG. 3 illustrating a folded state of the bag bottom carrier, and FIG. 4 illustrating a state in which the bag bottom carrier is unfolded and secured to the front frame via a coupling rod for loading of a golf bag.
Figure 4:
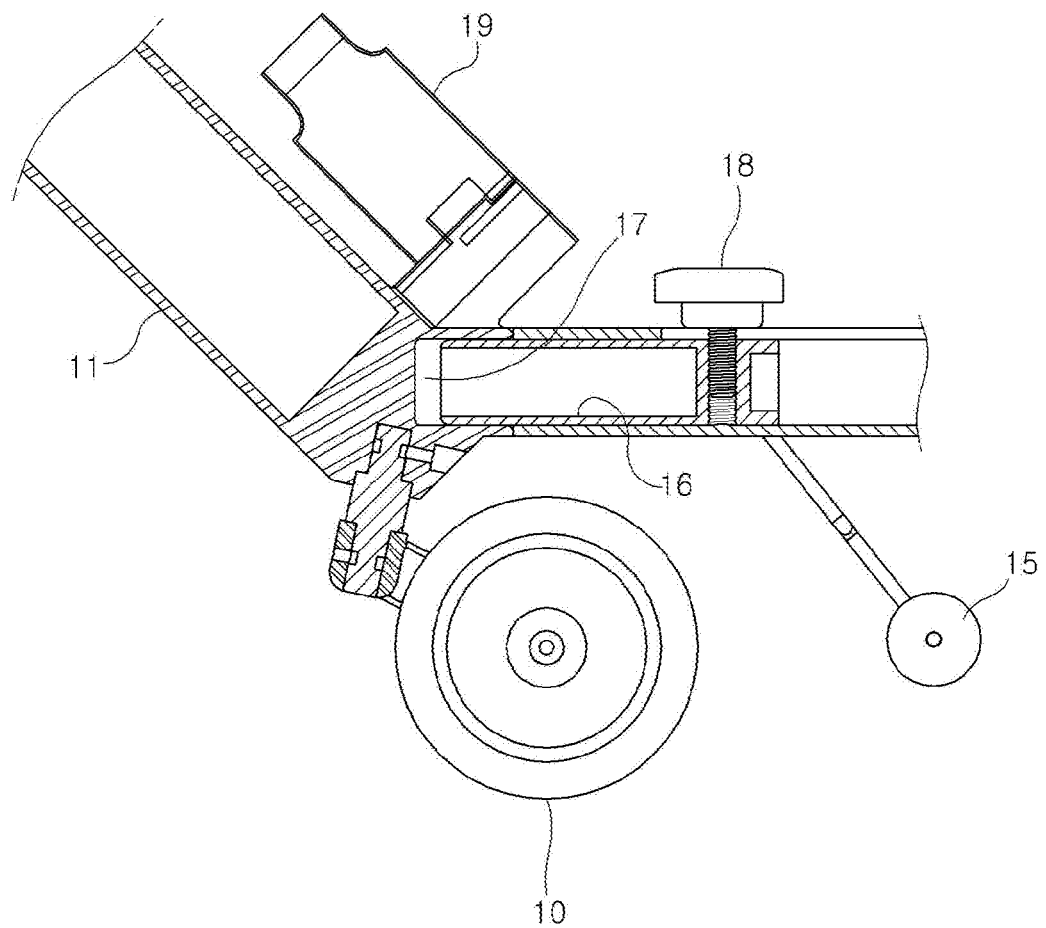

The pivoting control device may be selected from certain devices, such as, for example, a holding device or a coupling rod device. FIGS. 3 and 4 show an embodiment of the pivoting control device that takes the form of a coupling rod device. More specifically, FIG. 3 shows a folded state of the bag bottom carrier 11 for transportation of the cart according to the present invention, and FIG. 4 shows an unfolded state of the bag bottom carrier 11 to enable loading of a golf bag on the cart according to the present invention.

The coupling rod device as exemplarily shown in FIGS. 3 and 4 includes a coupling rod 16 installed to the front frame 1 and a receiving groove 17 formed in the bag bottom carrier 11. The coupling rod 16 is preferably installed to freely protrude toward the receiving groove 17, and the front frame 1 is preferably provided with a rod fixing member, such as a tightening bolt 18, to keep the coupling rod 16 in a protruding position. Preferably, a bag tightening band 19 is provided to bind a golf bag supported by the bag bottom carrier 11 and the bag support member 41 to prevent unintentional separation of the golf bag.

The front frame 1 is preferably provided with a pull hand 15 for use in a folded state of the cart. As such, in a completely folded state of the cart according to the present invention, the front frame 1 is directed toward the top and only the two rear wheels 20 and 30 roll over the ground to allow a golfer to draw the cart.

The rear wheels 20 and 30, which are installed respectively to the rear wheel frames 2 and 3, are preferably coupled to shaft bearings 201 of the rear wheel frames 2 and 3 so as to be freely separable from the shaft bearings 201. A structure of coupling shafts 7 of the rear wheels 20 and 30 to the rear wheel frames 2 and 3 is exemplarily shown in FIG. 5. In the case in which in-wheel motors are mounted to the rear wheels 20 and 30 and shafts of the motors are connected to the shafts 7 via power transmission mechanisms to enable rotation of the rear wheels 20 and 30 rotatably coupled to the shafts 7, while the shafts 7 of the rear wheels 20 and 30 need to be fixedly coupled to the shaft bearings 201, the shafts 7 may be freely rotatable relative to the shaft bearings 201 to prevent the motors from applying resistance to rotation of the wheels when the cart is manually pulled without operation of the motors.

Figure 5:
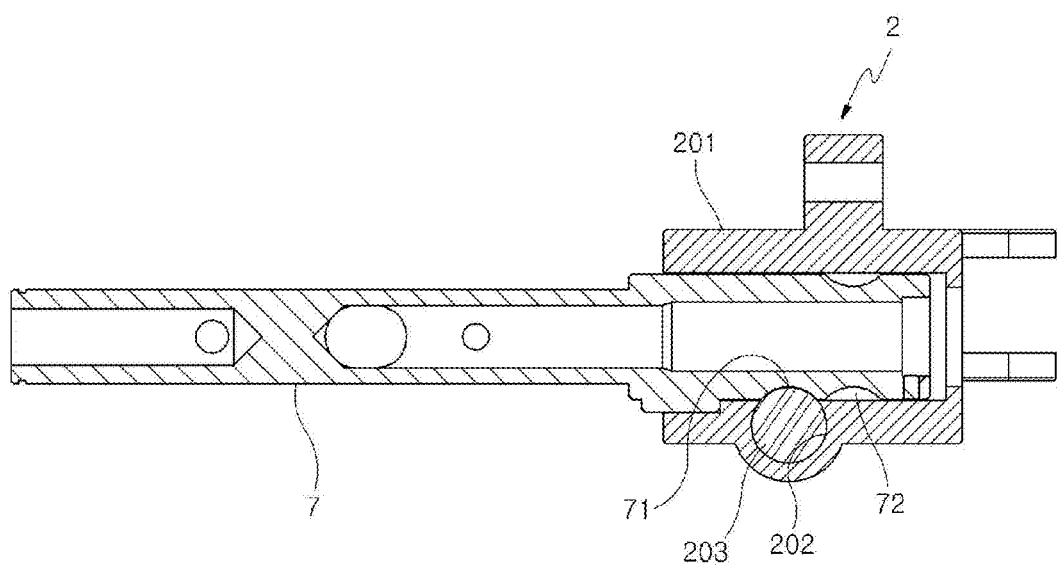
FIG. 5 is a view illustrating a selective coupling structure that couples a rear wheel shaft to a shaft bearing of a rear wheel frame in a stationary manner or in a freely rotatable manner.

The above-described coupling structure between the shafts 7 and the shaft bearings 201 of the rear wheel frames 2 and 3, which allows the shafts 7 of the rear wheels 20 and 30 to be secured to the shaft bearings 201 or to be freely rotatable relative to the shaft bearings 201, as exemplarily shown in FIG. 5, may include fixing coupling portions to fixedly couple the shafts 7 of the rear wheels 20 and 30 to the shaft bearings 201 so as to enable rotation of the wheels upon operation of the motors, and free rotation coupling portions to enable free rotation of the shafts 7 of the rear wheels 20 and 30 relative to the shaft bearings 201.

The fixing coupling portions and the free rotation coupling portions include key grooves 72 and peripheral grooves 72 formed in tip ends of the shafts 7 coupled to the wheels 20 and 30 and key mounts 202 formed in the shaft bearings 201 of the rear wheel frames 2 and 3. When keys 203 are fitted into the respective key mounts 202 after the key mounts 202 and the key grooves 71 are aligned to match each other, the shafts 7 are secured to the shaft bearings 201, thus allowing the wheels 20 and 30 to be rotated via operation of the motors. In addition, when the keys 203 are fitted into the respective key mounts 202 after the key mounts 202 and the peripheral grooves 72 are aligned to match each other, the shafts 7 of the wheels 20 and 30 are freely rotatable inside the shaft bearings 201.

The longitudinal prop 5 is installed between the front frame 1 and the bag support frame 4 in such a manner that both ends of the longitudinal prop 5 are coupled respectively to the front frame 1 and the bag support frame 4 via shafts. In addition, the longitudinal prop 5 has a middle portion, to which a shaft is coupled to allow the longitudinal prop 5 to be folded at the middle portion thereof. In the case in which the longitudinal prop 5 functions to prevent overturn of the bag support frame 4, to prevent unintentional folding of the longitudinal prop 5, an anti-folding member 51 is preferably installed to the shaft coupling portion of the longitudinal prop 5.

The transverse prop 6 serves to prevent the rear wheel frames 2 and 3 from excessively pivoting in a transverse direction beyond a given range and to achieve a constant wheelbase length. To this end, preferably, one side of the transverse prop 6 is installed to one of the rear wheel frames 2 and 3 via a shaft and the other end of the transverse prop 6 is coupled to the other one of the rear wheel frames 2 and 3 in a free coupling/separation manner.

The pull handle 42 is preferably installed to the bag support frame 4 via a shaft so as to perform folding motion.

In the present invention as described above, when the anti-folding member 51 is released from the longitudinal prop 5 and then the transverse prop 6 is released, the rear wheel frames 2 and 3 may be folded so as to be combined with each other. Subsequently, the bag support frame 4 and the pillars 22 and 32 may be folded toward the front frame 1 and, in turn, the bag bottom carrier 11 may be rotated and folded about the shaft 14. Thereafter, when the pull handle 42 is folded, the golf cart according to the present invention is in a completely folded state. When the rear wheels 20 and 30 are separated as needed, the resulting golf cart attains the shape of a box having a reduced volume. By performing the above-described folding procedure in reverse, the golf cart is unfolded to allow a golf bag to be loaded thereon.

In the above-described embodiment of the present invention, a weight of the golf cart may be limited to 12 kg even in a state in which in-wheel motors are mounted to the rear wheels 20 and 30, which allows the old and the infirm or women to easily handle the golf cart. Moreover, it was found that, when the golf cart, from which the rear wheels 20 and 30 are separated, is put in an empty space of the car trunk, the golf cart of the present invention can be sufficiently received, along with four golf bags (caddy bags) in a single car.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

As described above, the present invention may be wholly or partially applied to folding golf carts.

What is claimed is:

1. A folding golf cart comprising:

a front frame having a bag bottom carrier;

two rear wheel frames connected to the front frame via connecting bars, the connecting bars having both ends connected respectively to the rear wheel frames;

two rear wheels installed respectively to the two rear wheel frames;

vertical pivot frames installed respectively to the rear wheel frames so as to be pivoted upward and toward a front wheel;

pillars connected respectively to the vertical pivot frames; and a bag support frame connected to the pillars, the bag support frame having a bag support member and a pull handle;

wherein the bag bottom carrier is connected to the front frame via a shaft with a shaft coupling device interposed between the bag bottom carrier and the front frame, and the shaft coupling device includes a pivoting control device having a coupling rod installed to the front frame and a receiving groove formed in the bag bottom carrier.

2. The folding golf cart according to claim 1, wherein the front frame is provided with a pull hand for use in a folded state of the cart to allow the completely folded cart to be pulled in a state in which the front frame is directed toward the bag support frame and only the two rear wheels to roll over the ground.

3. The folding golf cart according to claim 2, wherein a coupling structure between a wheel shaft of each of the rear wheels and a shaft bearing of each of the rear wheel frames includes a fixing coupling portion to fixedly couple the wheel shaft to the shaft bearing and a free rotation coupling portion to enable free rotation of the wheel shaft relative to the shaft bearing.

* * * * *